J. D. BAST.
AUTOMOBILE SIGNAL.
APPLICATION FILED DEC. 19, 1916.
1,320,966.
Patented Nov. 4, 1919.
2 SHEETS—SHEET 1.
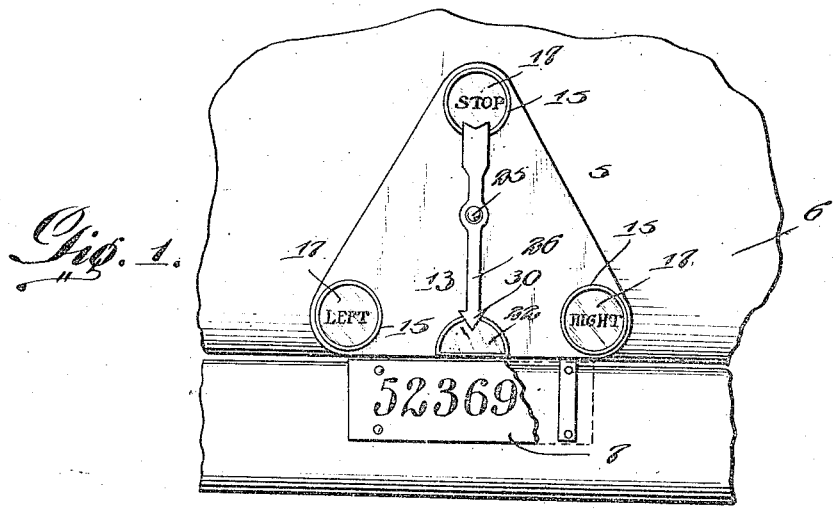
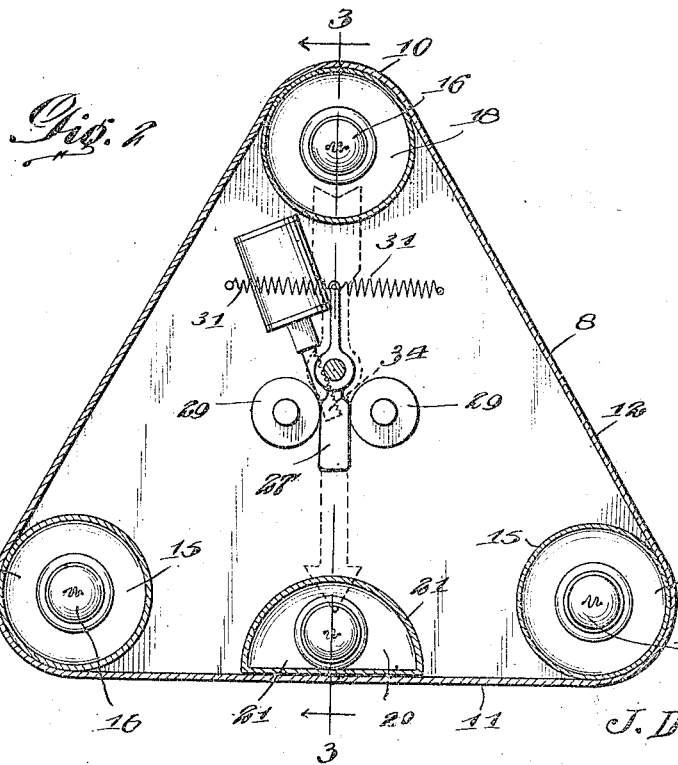
Witnesses
Frederick L. Fox
J. Irving King
Inventor
J. D. Bast.
By Victor J. Evans.
Attorney

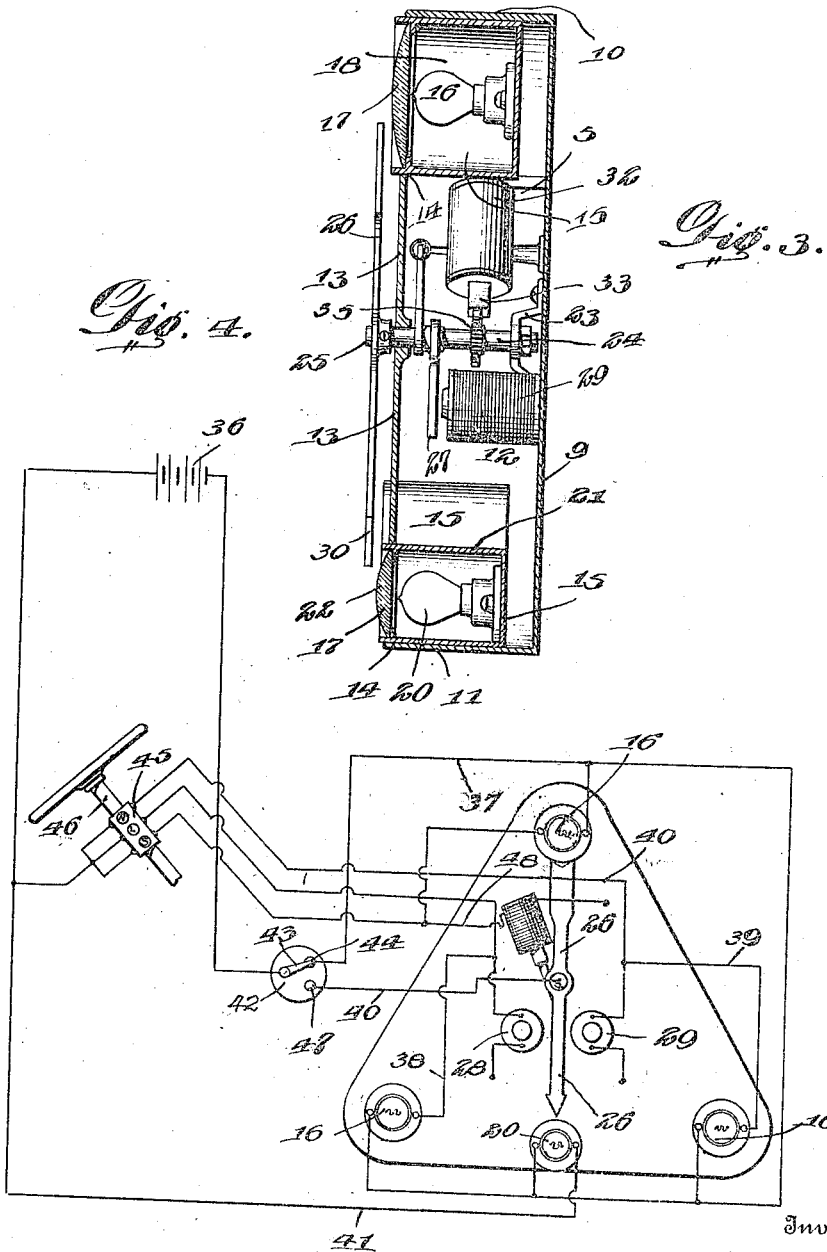

UNITED STATES PATENT OFFICE.

JOHN D. BAST, OF CANTON, OHIO.

AUTOMOBILE-SIGNAL.

1,320,966.

Specification of Letters Patent.  Patented Nov. 4, 1919.

Application filed December 19, 1916. Serial No. 137,861.

*To all whom it may concern:*

Be it known that I, JOHN D. BAST, a citizen of the United States, residing at Canton, in the county of Stark and State of Ohio, have invented new and useful Improvements in Automobile-Signals, of which the following is a specification.

The present invention provides novel signaling means for motor vehicles to give ample warning so as to avoid collisions or accidents, and is of such construction as to be readily attached to motor vehicles of any design, whether intended for passenger service or for hauling loads, so that the driver of the vehicle in the rear may be advised of the intention of the driver of the vehicle ahead, thus preventing a rear end collision.

An object of the invention is the provision of a novel type of signal of the above stated character, primarily adapted for use in either the day or the night, indicating that the vehicle is about to take a turn to the right or to the left, or is about to stop, the night signal embodying illuminating means, while the day signal consists of a movable arrow-shaped arm, and electrically operated means for controlling both the day and night signal.

A further object of the invention is the provision of a device of the above stated character which shall be simple in construction, durable in use, well adapted for the purposes intended, and wherein the controlling means for the signals are positioned in convenient reach of the operator of the machine to permit of a quick and easy operation of both the day and night signals at all times.

With the above and other objects in view, the invention consists in the novel features, details of construction and combination of parts which will hereinafter be more fully set forth, illustrated in the accompanying drawing and pointed out in the appended claim.

Figure 1 is a front elevation of the signal attached to the vehicle, and illustrating the license plate in assembled position;

Fig. 2 is a vertical section taken through the signal;

Fig. 3 is a section taken on line 3—3 of Fig. 2; and

Fig. 4 is a diagrammatic view of the wiring.

Referring more particularly to the drawing, the reference character 5 denotes the signal generally and is illustrated as attached to the rear of the body portion 6 of a motor vehicle and directly above the license tag 7.

In order that this signal 5 may be useful to denote when the operator of the machine ahead is about to make a turn to either the right or the left or to stop, I have so constructed the parts thereof whereby the signal is useful either as a day or a night signal. To this end, I employ a metallic casing 8 of substantially triangular form, and embodying a rear wall 9, a contracted curved top wall 10, a broadened straight bottom wall 11, the contracted upper end 10 being connected with the straight bottom wall 11 through the medium of the downwardly and outwardly diverging side walls 12. The casing is closed by means of the face plate 13. This face plate 13 is of identical construction to conform with the configuration of the casing 8 and is provided at its opposite corners with circular openings 14 into which fit the cylindrical lamp casings 15. Installed in each of the lamp casings is the usual electric light 16, while the front end of the casing is closed by the glass plates or lens 17. The lamp casings when associated with the casing 8 disposed the same in substantially triangular form with respect to one another, and provides a light 18 in the contracted curved top end 10 of the casing, and a pair of lights 19 in the opposite lower corners of the casing, the purpose for so positioning the lights with respect to the casing will be clearly set forth as the description of the invention is proceeded with. Located in the central vertical line of the casing 8 and interposed between the pair of lowermost lights 19 is a tail light 20 having its casing 21 closed by the usual colored glass 22. The plates or lenses 17 closing the casings of the respective lamps 18 and 19, bear proper characteristics to designate to the driver of the machine in the rear, of the intention of the driver of the machine ahead, whether he is about to turn to the right or to the left or to stop, better shown in Fig. 1 of the drawing. Secured to the inner face of the rear wall 9 of the casing is a bracket 23, and journaled in the face plate 13 and said bracket, is a shaft 24 protruding beyond the plane of the face plate 13, as indicated by the character 25. Mounted upon the protruding end 25 of the shaft, and located exteriorly of the casing is an arrow-shaped indicating arm 26, which when in neutral position points to the tail light 22 and the "stop" light 18.

Located within the casing 8 and mounted upon the shaft 24 is an armature 27 adapted to be attracted upon the energizing of the pair of magnets 28 and 29, which in turn imparts oscillatory movement to the indicating arm 26, in opposite directions, and throwing the pointed end 30 of the indicating arm in registration with one of the "left" or "right" lights.19, thus making the signal useful as a day signal, while connected to the upper end of the armature 27 is a pair of equalizing springs 31, permanently connected at their outer terminals to the rear wall 9 of the casing, and serving, upon deënergizing the magnets 28 and 29, to throw the indicating arm 26 to its neutral position, better shown in Fig. 1 of the drawing.

It will, of course, be understood that the lights 18 and 19, when illuminated, clearly disclose the characteristics appearing on the lens plate 17 thereof, to indicate the intentions of the driver of a motor car. Inasmuch as the stop indicator 18 is positioned in the extreme upper contracted end of the casing, it is necessary that some means be employed whereby the indicating arm 26 will be operated to turn the same for a full half revolution. To this end, use is made of a solenoid 32 installed in the casing 8 and having its core 33 provided with a rack bar 34 adapted to reciprocate and mesh with the pinion 35 on the shaft 24, which in turn will operate the arm 26 for a complete half revolution, bringing the indicating end of the arm to point directly to the stop signal 18, thus warning the driver of a car in the rear that the driver of the car ahead is about to make a stop, it, of course, being understood that this structure is adaptable for the signal when the same is utilized as a day signal.

The foregoing description is believed to give a clear understanding as to the parts constituting my improved combined night and day signal, therefore, I will briefly refer to the means for electrically operating such signals. The wiring, better shown in Fig. 4 of the drawing, constitutes a battery 36, which is common to the "stop" lamp circuit 37, the left lamp circuit 38, the right lamp circuit 39, the indicating arm circuit 40 and the tail light circuit 41. Arranged in the circuit and disposed in convenient reach of the operator of the machine, is a two-way switch 42 and by moving its arm 43 on the contact point 44 will close the lamp circuits and the lamp will then be actuated by the circuit closing means 45, preferably positioned upon the steering column 46 of the vehicle, whereas when the arm 43 is swung upon the contact point 47, will energize the magnets 28 and 29 and by actuating the actuating means 45, will throw the indicating arm 26 either to the right or to the left and makes the signal valuable as a day signal. The solenoid 32 is installed in the circuit 48, whereby upon the operator actuating the circuit closing means 45, will cause the reciprocation of the core 33 and thus revolve the shaft 24, owing to the provision of the rack bar and the same meshing with the pinion 35 of the shaft.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claim.

What I claim is:

A direction indicating signal for motor vehicles, a casing, indicating lamps carried by one wall of the casing and arranged in triangular relation, a shaft journaled between certain walls of the casing, an indicator fixed on said shaft and movable across said lamps, an armature depending from said shaft, magnets arranged within the casing for oscillating said shaft and causing said indicator to turn a quarter of a revolution in opposite direction, a pair of equalizing springs having their adjacent terminals connected with said indicator, a pinion fixed on said shaft, a solenoid arranged within the casing above said magnet, the coil of said solenoid having a rack bar meshing with said pinion, whereby said indicator may be rotated a half a revolution to coöperate with the uppermost lamp of the casing.

In testimony whereof I affix my signature.

JOHN D. BAST.